Feb. 23, 1932.   W. RICHTER ET AL   1,846,438
EXPANDING MANDREL
Filed Jan. 12, 1931
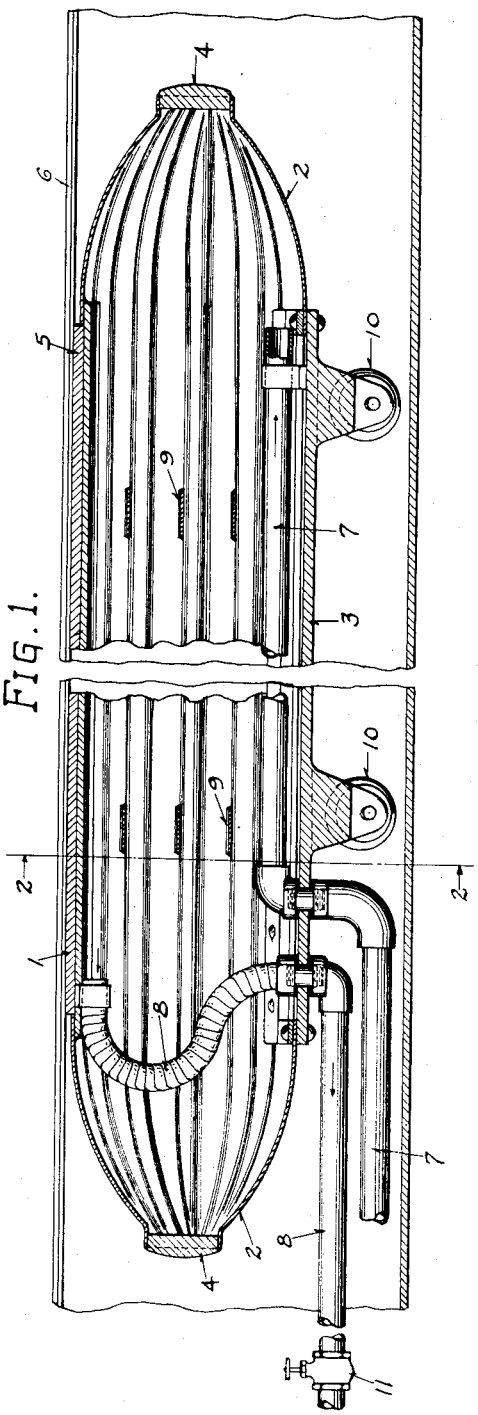
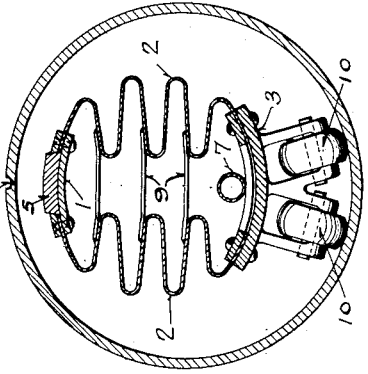
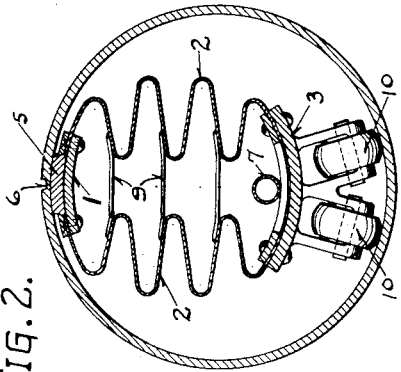
INVENTORS:
Walther Richter
Walter E. Richter
BY
ATTORNEY.

Patented Feb. 23, 1932

1,846,438

UNITED STATES PATENT OFFICE

WALTHER RICHTER, OF MILWAUKEE, AND WALTER E. RICHTER, OF SHOREWOOD, WISCONSIN, ASSIGNORS TO A. O. SMITH CORPORATION, OF MILWAUKEE, WISCONSIN, A CORPORATION OF NEW YORK

EXPANDING MANDREL

Application filed January 12, 1931. Serial No. 508,074.

This invention relates to an expanding mandrel for the electric welding of tubular articles.

It relates particularly to a mandrel for electric welding the longitudinal seam in pipe formed of sheet metal.

One of the objects of the invention is to provide an expansible metallic mandrel of simple design in which frictional wear between moving parts is eliminated.

Another object is to provide an expansible mandrel in which the operating fluid is utilized to cool the molten weld metal. Other objects will be brought out in the description and the accompanying illustrations of the invention.

Figure 1 is a longitudinal section of the mandrel inserted in a pipe.

Fig. 2 is a section along the line 2—2 of Fig. 1.

Fig. 3 is a view similar to Fig. 2 showing the mandrel in the contracted position.

In the welding of the longitudinal seam in sheet metal pipe it is advantageous to have a backing member or chill held firmly in position against the under side of the seam to prevent the molten weld metal from running through the welding groove and producing irregular beads along the inside of the seam, and to prevent the welding arc from burning through the metal at the seam.

It is further advantageous to maintain this backing member or chill as cool as possible so that the molten weld metal congeals immediately upon coming in contact with it. Unless this takes place the molten metal tends to stick to the backing member and thus in effect to weld said member to the pipe.

The preferred embodiment of the invention is shown in the drawings and comprises a mandrel whose operating element is an expansible vessel formed by a top plate 1, corrugated metal sides 2, and a base 3. The sides 2 are fastened to the top plate 1 and to the base 3 by suitable means such as riveting, welding, or clamping so as to form a fluid tight vessel. The ends of the vessel are tapered to a smaller diameter and are closed by plugs 4.

The top plate 1 is provided with a seat for the replaceable chill strip 5. This chill strip 5, being in contact with the hot metal of seam 6, is short lived and requires frequent replacing. The top plate 1 and the chill strip 5 are preferably made of good heat-conducting material such as copper and are relatively thin so that the heat of the welding process is rapidly conducted through them. The top plate 1 and the chill strip 5 also possess sufficient flexibility to conform to the irregularities which may exist in a long welding seam.

The sides 2 are of thin flexible metal corrugated so that the ridges run lengthwise of the vessel. The lower side of the vessel is formed by the base 3.

An inlet pipe 7 and an outlet pipe 8 enter the vessel through the base 3. These pipes serve as ducts for the operating and cooling fluid. The inlet pipe 7 terminates near the base 3 at one end of the vessel while the outlet pipe 8 terminates at the opposite end of the vessel near the top plate 1. The terminal of the outlet pipe 8 is permanently attached to the top plate 1, and the portion of said pipe lying within the expansible vessel is constructed of flexible tubing so as to allow said terminal to rise and fall with the top plate 1.

The vessel is expanded by introducing a fluid under pressure through the inlet pipe 7. This fluid pressure acts directly against the top plate 1, raises it, and presses the chill-strip 5 against the seam 6 to be welded. The fluid pressure acts also against the thin corrugated side members 2, and to prevent any considerable outward movement of said members suitable tie strips 9 are welded at their ends to the opposing interior convolutions thereby holding each interior convolution in predetermined spaced relation to its opposing interior convolution. Each pair of opposing interior convolutions thus joined is free to move upward or downward independent of the other joined pairs.

The operation of the mandrel is as follows:

The pipe to be welded is slipped over the mandrel so that the seam is directly over the chill strip 5. The rollers 10 attached to the base 3 reduce friction between the pipe and said base. A fluid under pressure, preferably a cooling liquid, such as water, is admitted to the interior of the expansible vessel through the pipe 7. The pressure of the fluid acts directly upon the underside of the top plate 1, forces the chill strip 5 upward, and presses it against the underside of the seam 6 to be welded.

A circulation of the operating fluid against the top plate 1 is maintained by permitting a limited amount of said fluid to escape through the outlet pipe 8. The flow through outlet pipe 8 is regulated by means of a valve 11 to an amount which is insufficient to produce a material drop in the operating pressure but is sufficient to remove the fluid which has been in contact with the chill strip and has become heated. The fluid escaping through the outlet pipe 8 is replaced by cool fluid entering through the inlet pipe 7. Since the top plate 1 and the chill strip 5 are relatively thin, the cooling liquid comes into close proximity to the seam 6 being welded and effects a rapid chilling of any molten metal which may run down through said seam.

The fluid pressure acts simultaneously along the entire length of the top plate 1 and forces the flexible chill strip 5 into conformation with all of the irregularities existing in the seam 6.

The upward movement of top plate 1 is made possible by the corrugations of the side walls 2 which expand and thus supply the additional side wall area. The fluid pressure acts also against the side walls 2 tending to push them outward, which tendency is opposed by the tie strips 9 and by the inherent stiffness of the corrugated sides 2 against deflection in this direction.

The welding may be performed according to any suitable electric welding process, preferably the arc welding method, and the mandrel may be of a length substantially equal to the length of the pipe or may be only a fractional part of this length. A short mandrel of this type may be used in a progressive welding process and is moved upon the rollers 10 relative to the pipe so that it remains in substantially a fixed position with respect to the area being welded.

The chilling action of the operating liquid may also be dispensed with and compressed air may be employed. In this case a separate inlet pipe 7 and outlet pipe 8 are not required. The top plate 1 may also be made of a more non-flexible nature. The ends may be closed by means other than the tapering projections; the rollers 10 may be dispensed with or be replaced by other anti-friction devices; the number of convolutions of the side walls 2 may be changed and the tie strips 9 may be omitted, especially if the convolutions be reduced to one convex bend for each side.

While the invention has been shown in the preferred form, it is understood that it may have various modifications within the scope of the claims.

We claim:

1. An expansible mandrel for the electric welding of tubular articles comprising a top plate, a chill strip, flexible metal sides, and a base, said top plate, sides and base forming an expansible vessel, and fluid conducting means for introducing a fluid under pressure into said vessel to expand the same and force the chill strip against the welding seam throughout substantially the entire length of the chill strip.

2. An expansible mandrel for the electric welding of tubular articles comprising a top plate, a chill strip, thin walled longitudinally corrugated metal sides, and a base, said top plate, sides and base forming a vessel, and fluid conducting means for introducing a fluid under pressure into said vessel to expand the same and force the chill strip against the welding seam throughout substantially the entire length of the chill strip.

3. An expansible mandrel for the electric welding of tubular articles comprising a top plate, a chill strip, thin walled longitudinally corrugated metal sides, and a base, said top plate, sides and base forming an expansible vessel, and fluid conducting means for introducing a cooling fluid under pressure into said vessel to expand the same and thereby force the chill strip against the welding seam and to cool the chill strip durng welding.

4. An expansible mandrel for the electric welding of tubular articles comprising a top plate, a chill strip, thin walled longitudinally corrugated metal sides, a base, said top plate, sides and base forming an expansible vessel, and fluid conducting and circulating means for introducing a cooling fluid under pressure into said vessel and for circulating the cooling fluid therein against said chill strip to cool the same.

5. An expansible mandrel for the electric welding of tubular articles comprising a flexible top plate and chill strip, thin walled longitudinally corrugated metal sides, and a base, said top plate, sides, and base forming an expansible vessel, and fluid conducting means for introducing a fluid under pressure into said vessel to expand the same and force said flexible chill strip against the metal at the underside of the seam being welded to thereby cause said chill strip to conform to the irregularities of said metal.

6. An expansible mandrel for the electric welding of tubular articles comprising a top plate, a chill strip, a plurality of thin walled longitudinally corrugated metal sides, retaining tie strips for said sides, a supporting base, and friction reducing supports for said base, said chill strip, sides, and base forming an expansible vessel, and fluid conducting means for introducing a fluid under pressure into said vessel.

7. An expansible mandrel for the electric welding of tubular articles comprising a top plate, a chill strip, two thin walled longitudinally corrugated metal sides, retaining tie strips for said sides, a supporting base, said top plate, sides, tie strips and base forming an expansible vessel, friction reducing supports for said base, and a fluid conducting inlet and outlet for introducing and circulating a cooling fluid under pressure into said vessel to expand said vessel and to cool the chill strip.

In testimony whereof, we have signed our names at Milwaukee, Wisconsin, this 9th day of January, 1931.

WALTHER RICHTER.
WALTER E. RICHTER.